United States Patent
Werner et al.

(10) Patent No.: US 7,097,516 B2
(45) Date of Patent: Aug. 29, 2006

(54) CONNECTING BOX FOR A SOLAR PANEL AND SOLAR PANEL

(75) Inventors: Elke Werner, Darmstadt (DE);
Guenter Feldmeier, Lorsch (DE);
Heinz Scherer, Bensheim (DE);
Markus Strelow, Moerlenbach (DE);
Andreas Woeber, Kronau (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 10/895,609

(22) Filed: Jul. 21, 2004

(65) Prior Publication Data
US 2005/0054244 A1   Mar. 10, 2005

(30) Foreign Application Priority Data
Jul. 21, 2003   (DE) ........................... 203 11 183 U

(51) Int. Cl.
*H01R 9/22* (2006.01)
(52) U.S. Cl. ...................... 439/709; 439/852
(58) Field of Classification Search ............... 439/709, 439/850, 852
See application file for complete search history.

(56) References Cited

U.S. PATENT DOCUMENTS

| | | | |
|---|---|---|---|
| 4,310,211 A | 1/1982 | Bunnell et al. | |
| 4,460,232 A * | 7/1984 | Sotolongo | 439/535 |
| 5,513,075 A | 4/1996 | Capper et al. | |
| 5,769,672 A * | 6/1998 | Flieger | 439/850 |
| 6,582,249 B1 * | 6/2003 | Boeck et al. | 439/492 |
| 6,655,987 B1 * | 12/2003 | Higashikozono et al. | 439/535 |

FOREIGN PATENT DOCUMENTS

| | | |
|---|---|---|
| DE | 196 10 958 A1 | 9/1997 |
| EP | 0 521 189 A1 | 7/1991 |
| EP | 0 999 601 A1 | 5/2000 |
| EP | 1 102 354 A2 | 5/2001 |
| WO | WO 98/25325 | 6/1998 |
| WO | WO 00/30216 | 5/2000 |

\* cited by examiner

Primary Examiner—Truc Nguyen
(74) Attorney, Agent, or Firm—Barley Snyder LLC

(57) ABSTRACT

The connecting box comprises contact elements which allow automatic contacting and assembling of a solar panel with the connecting box. The solar panel comprises fixed contacts suitable for automatic contacting with the contact elements of the connecting box. The contact elements of the connecting box comprise tapered receiving regions allowing automatic insertion of the fixed contacts of the solar panel into a contact region of the contact elements. Inexpensive production is possible as a result of automatic assembling of the panels with the connecting boxes.

5 Claims, 6 Drawing Sheets

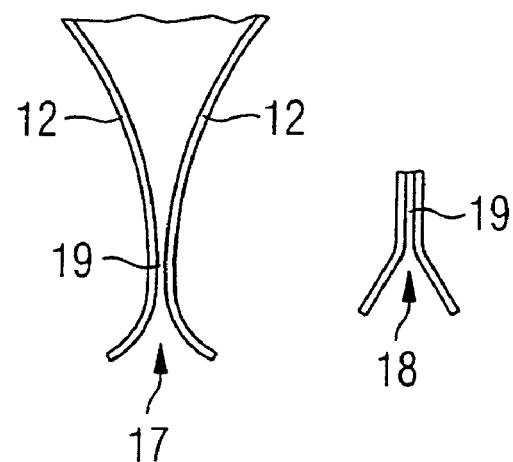
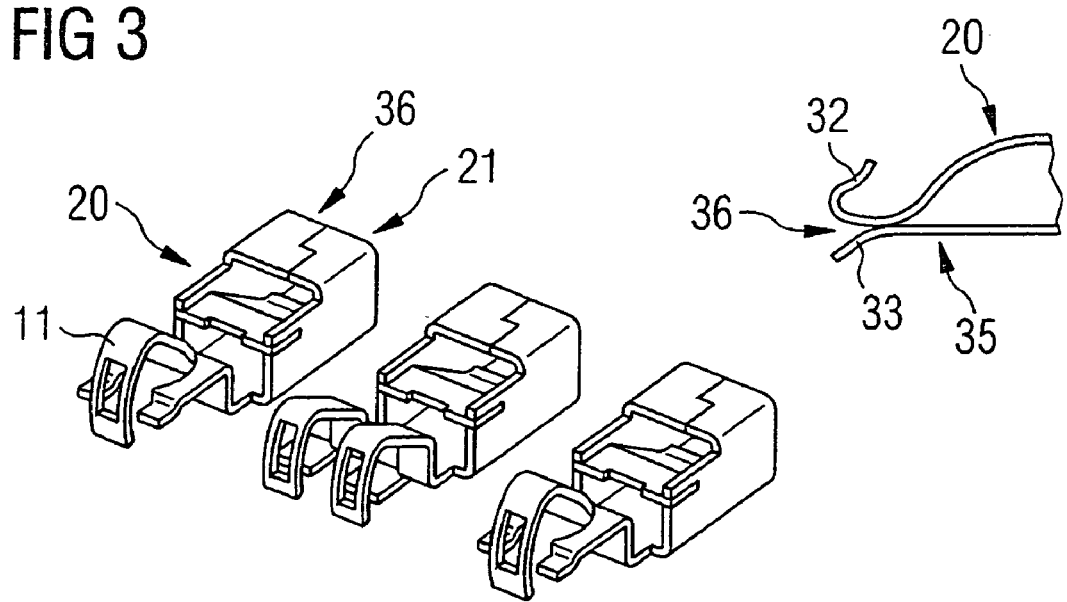

CONNECTING BOX FOR A SOLAR PANEL AND SOLAR PANEL

FIELD OF THE INVENTION

The invention relates to a connecting box for a solar panel and to a solar panel using the connecting box.

BACKGROUND OF THE INVENTION

Solar panels have a large number of solar cells which are used to convert power from sunlight. Power generated by the solar cells is coupled via electric lines to a rectifier for example, for feeding into the alternating current (AC) network or to a battery. A connecting box is generally provided for coupling to the solar panel.

A connecting box is known from European patent application EP 1 102 354 A2. The connecting box has a housing, in the base board of which is provided an opening for introducing the electric lines of the solar panel. Electrical contacts for contacting the electric lines are provided in the connecting box. The electrical contacts are in turn connected to terminal pins which are arranged in a sidewall of the housing and are used for connecting electric lines. The connected electric lines lead to the rectifier or to the battery. Conductor rails comprising a contact region for detachable connection of a foil conductor of the solar panel are provided in the housing as the electrical contacts. The contact region comprises a metal clamping spring to which the foil contact can be securely clamped. For introducing the foil contact, the clamping spring is opened in a clamping region by means of tool, then the foil contact is introduced into the clamping spring and the tool then removed from the clamping spring, so the clamping spring recoils into the starting position and in the process securely clamps the foil contact.

An object of the invention is to provide a connecting box and a solar panel with which simple contacting between the connecting box and the solar panel is possible.

SUMMARY OF THE INVENTION

In an embodiment of the invention, a contact of the connecting box positioned in a housing has a spring contact arm with an insertion region for automatic feeding of the electrical contacts of the solar panel. The insertion region of the spring contact arm tapers in the direction of a contact region. The contact is preferably formed by two spring contact arms. The spacing between the two spring contact arms in the contact region is smaller than the diameter of the contacts of the solar panel to be contacted. Secure and simple contacting of the electrical contacts of the solar panel is possible as a result of a conically tapering insertion region.

BRIEF DESCRIPTION OF THE DRAWINGS

The invention will be described in more detail hereinafter with reference to the figures, in which:

FIG. 2 is a cross-sectional view taken through the insertion region of the spring contact arms;

FIG. 3 shows a further embodiment of conductor rails with clamping springs;

DETAILED DESCRIPTION OF THE INVENTION

Figure 1:
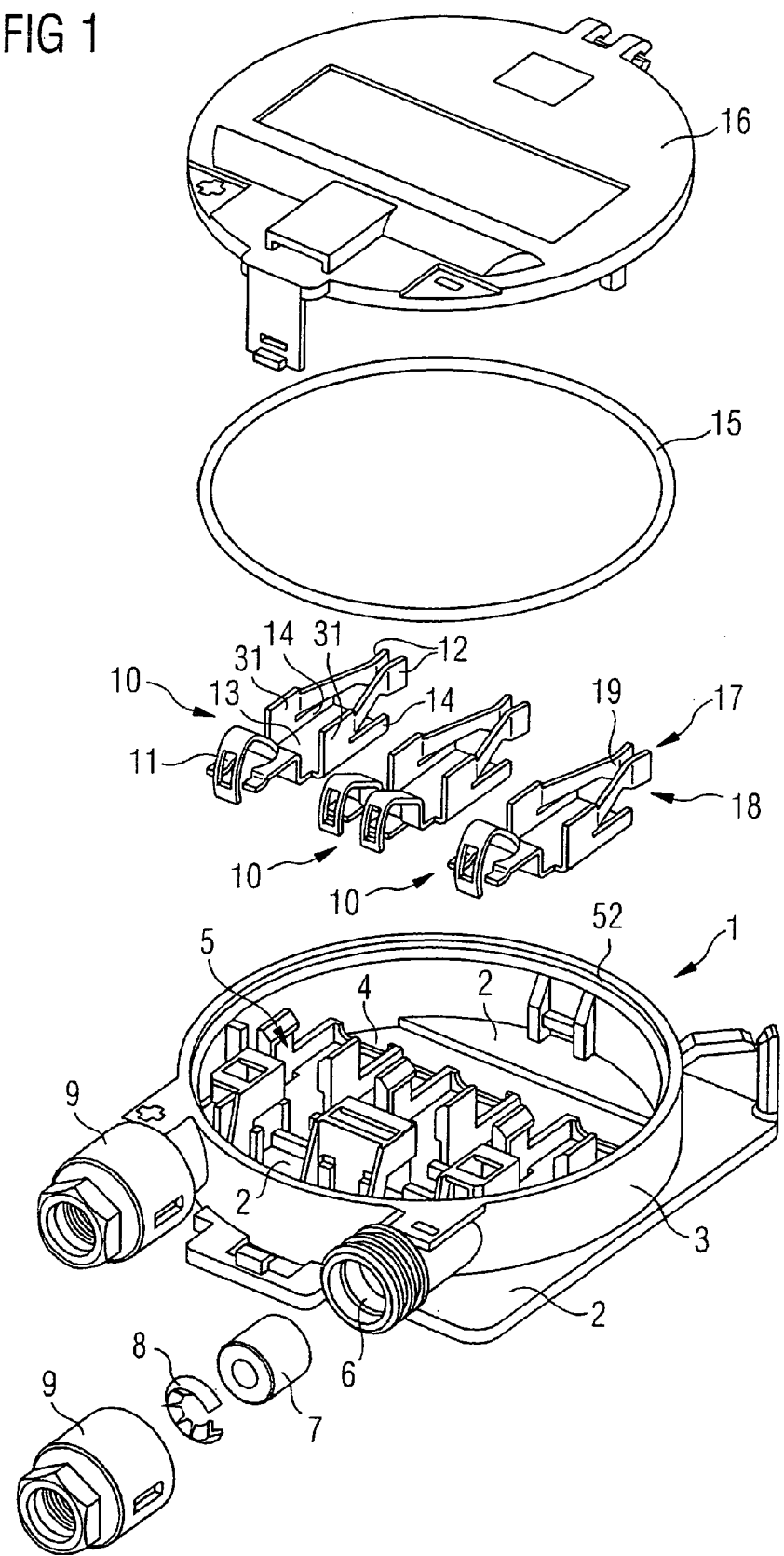
FIG. 1 is exploded view of a first connecting box.

FIG. 1 shows the major components of a connecting box 1. The connecting box 1 comprises a base board 2 on which a circular side wall 3 is provided. An opening for feeding electric lines of a solar panel is formed in the base board 2. Holding device 5 for receiving contact elements 10 is provided on the base board 2. Cable openings 6 for feeding a cable are formed in the side wall 3. Each cable opening 6 is surrounded by a threaded sleeve onto which a sleeve nut 9 can be screwed. To seal the introduced cable, a seal 7 is disposed in the cable opening 6. The seal 7 has a passageway for the cable and is made from a resilient material. A snap ring 8 is arranged between the seal 7 and an abutment region of the sleeve nut 9. When the sleeve nut 9 is screwed onto the threaded sleeve of the cable opening 6, the seal 7 is pushed against a stop face of the side wall 3 and in the process compressed in the longitudinal direction so the diameter of the passageway is reduced and the external diameter of the seal 7 increased. A secure seal between the housing of the connecting box and the cable is thus achieved.

Three contact elements 10, are inserted into the holding devices 5 and arranged in the connecting box 1. The contact elements 10 are composed of a rectangular contact base 13 on which, at one end, a spring terminal 11 for contacting an electric line is provided. The contact base 13 has, on both longitudinal sides, upwardly bent side edges 14 which extend in a back region, to a fixed end 31. The fixed end 31 extends perpendicularly to the contact base 13 beyond the lateral edges 14. Two spring arms 12 extend from the fixed end 31 opposite the spring terminal 11. The spring arms 12 are bent toward each other and toward the center of the contact base 13. The two spring arms 12 are at an acute angle to one another and have a minimum spacing in a contact region 19 arranged in front of the contact base 13. The spring arms 12 can also touch each other in the contact region 19.

The contact region 19 is used to contact a fixed contact of a solar panel and is arranged perpendicular to the base board 2. For this purpose, the contact region 19 has a front receiving region 17 and a lower receiving region 18. In the front receiving region 17, the two spring arms 12 are bent outwards, starting from the contact region 19, so a front receiving region 17 tapering in the direction of the contact region 19 is formed, as shown in FIG. 2. The two spring arms 12 are also arranged at an acute angle to one another in the lower receiving region 18, so a lower receiving region 18 tapering from the bottom is also formed, as shown in FIG. 2. Automatic insertion of a fixed contact of a solar panel into the contact region 19 from below and from the front is thus possible.

A sealing groove 52, is formed in the peripheral side wall 3 for receiving a sealing ring 15. A removable lid 16, which covers the connecting box 1 and seals against moisture, is placed on the side wall 3 during assembly. A peripheral sealing face, with which the connecting box 1 is glued to a solar panel by an automatic assembling operation, is provided on the lower side of the base board 2. For this purpose, glue is applied to the sealing face and then the connecting box 1 is placed on the solar panel, the contact elements 10 are contacted by correspondingly associated fixed contacts of the solar panel by the automatic placement operation.

FIG. 2 shows two cross-sections through the contact region 19 of a contact element 10. The left-hand diagram shows a cross-section in the longitudinal direction of the spring arms 12 and the right-hand diagram shows a cross-section perpendicular to the longitudinal direction of the spring arms 12 through the contact region 19. The tapered front receiving region 17 can clearly be seen in the left-hand diagram. The tapered lower receiving region 18 can be seen in the right-hand diagram. The lower receiving region 18 merges into the front receiving region 17, so a tapered receiving region is also formed in the transition region between the front and the lower receiving region 17, 18. The contact element 10 can thus be placed by a placement operation vertically from above onto the solar panel, in which the fixed contact of the solar panel is inserted into the contact region 19 through the lower receiving region 18, and also by a lateral pushing-on operation in which the fixed contact of the solar panel is inserted into the contact region 19 via the front receiving region 17, in an automatic contacting operation. In addition, any placement direction between a vertical and a lateral placement direction is possible. In a plane perpendicular to an insertion direction, the receiving region therefore comprises an opening region of up to 90°. The receiving region is oriented in the direction of the base of the connecting box and a back region of the connecting box. It is thus possible to place the contacts of the connecting box directly from above onto the contacts of the solar panel or from the side onto the contacts of the solar panel.

FIG. 3 shows, in a perspective view, three second contact elements 20 which can be inserted into the holding devices 5 of the connecting box 1 instead of the contact elements 10. The second contact elements 20 also have spring terminals 11 which are formed in one piece with further contact terminals 21. The further contact terminals 21 have a third receiving region 36 arranged opposite the spring terminals 11.

FIG. 3 shows, on the right-hand side, a cross-section through the further contact terminal 21 of a second contact element 20. The further contact terminal 21 comprises a spring contact arm 32 with a second spring contact arm 33 defining a second contact region 35. A third receiving region 36 tapering in the insertion direction is formed adjacent the second contact region 35 between the spring contact arm 32 and the second spring contact arm 33. The spring contact arm 32 is resiliently held and has, preferably in the second contact region 35, a fixed spacing from the fixed second spring contact arm 32. The second contact element 20 is also suitable for contacting in an automatic placement operation because of the tapered third receiving region 36. The second contact region 35 is arranged parallel to the base board 2.

Figure 4:
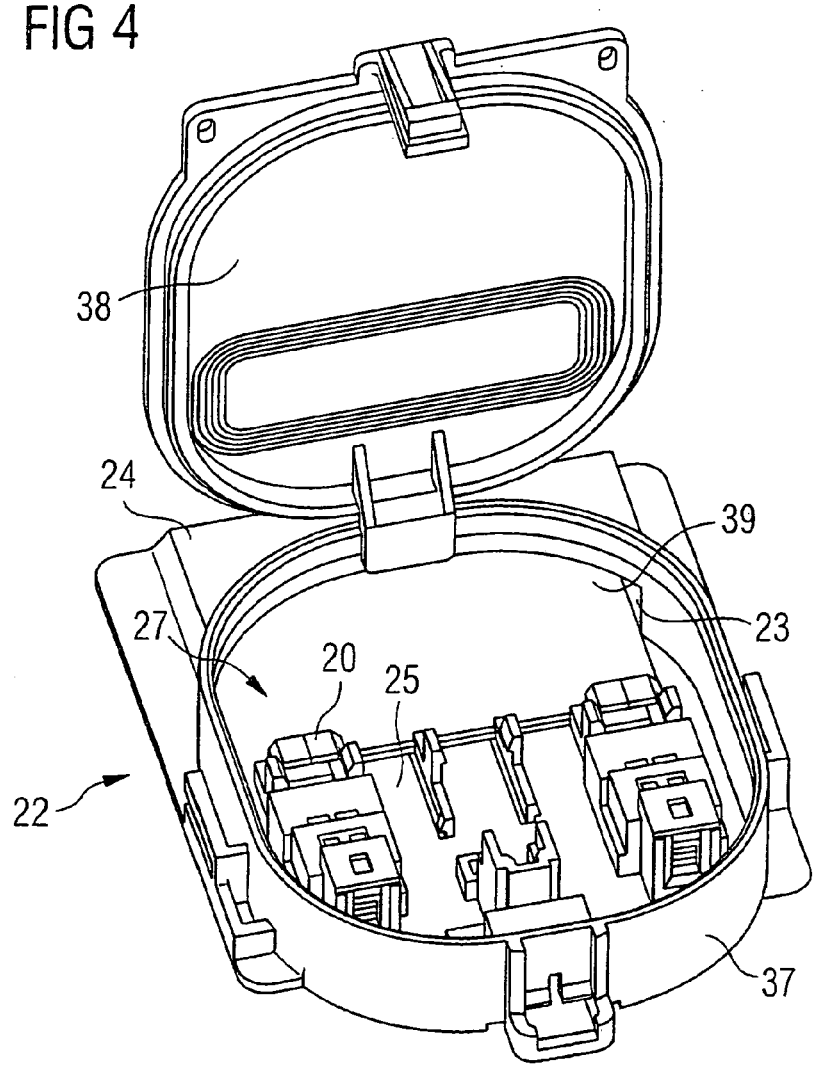
FIG. 4 shows a second embodiment of a connecting box.

FIG. 4 shows a second connecting box 22 providing a further embodiment of a connecting box. The second connecting box 22 comprises a second base board 25 and a second peripheral side wall 37. The peripheral side wall 37 defines a lid opening 27. A second lid 38 is held on the peripheral side wall 37. The second base board 25 covers a front region of the second connecting box 22 and extends right up over the center of the lid opening 27. In a back region, the second base board 25 has a second opening 39 extending up to a back edge region of the sealing face 26. The peripheral side wall 37 merges, in a back region, into a housing wall 24 guided up to a back side wall. The housing wall 24 delimits a receiving space 23 formed behind the lid opening 27. The receiving region 23 is used, during the automatic assembly operation, to receive the fixed contacts of the solar panel and allows a subsequent lateral displacement of the second connecting box 22 with respect to the fixed contacts. The fixed contacts of the solar panel located in the receiving space 23 are pushed in the direction of the second contact elements 20 during the lateral displacement. The formation of a receiving space 23 is also possible in the embodiment of the connecting box 1 of FIG. 1.

Figure 5:
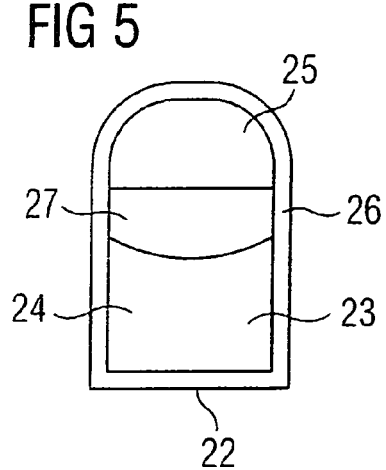
FIG. 5 is a view from below of the connecting box of FIG. 4.

FIG. 5 shows a view from below of the second connecting box 22. A peripheral sealing face 26, which is flat in construction and is used for peripheral, tight gluing of the second connecting box 22 to the flat surface of the solar panel, can clearly be seen here. The second base board 25, ending in a region located beneath the lid opening 27, is arranged in the front region. The receiving space 23 covered by the housing wall 24 is formed in the back region. During automatic assembly of the second connecting box, the second connecting box, of which the peripheral sealing face 26 is covered by an adhesive, is guided until just over the surface of the solar panel, wherein the fixed contacts of the solar panel are located in the receiving space 23. The fixed contacts are then inserted into the contact regions 19, 35 of the contact elements 10 or the second contact elements 20 by a lateral movement. The second connecting box with the sealing face 26 is then placed on the surface of the solar panel. Once the glue has dried, the second connecting box 22 is rigidly connected to the solar panel.

The second connecting box 22 comprises, on the second base board 25, contact elements 10 or second contact elements 20. In the illustrated embodiment, the second connecting box 22 does not have any terminals for electric lines. The second connecting box 22 can also have cable openings 6 corresponding to the connecting box of FIG. 1, depending on the embodiment.

Figure 6:
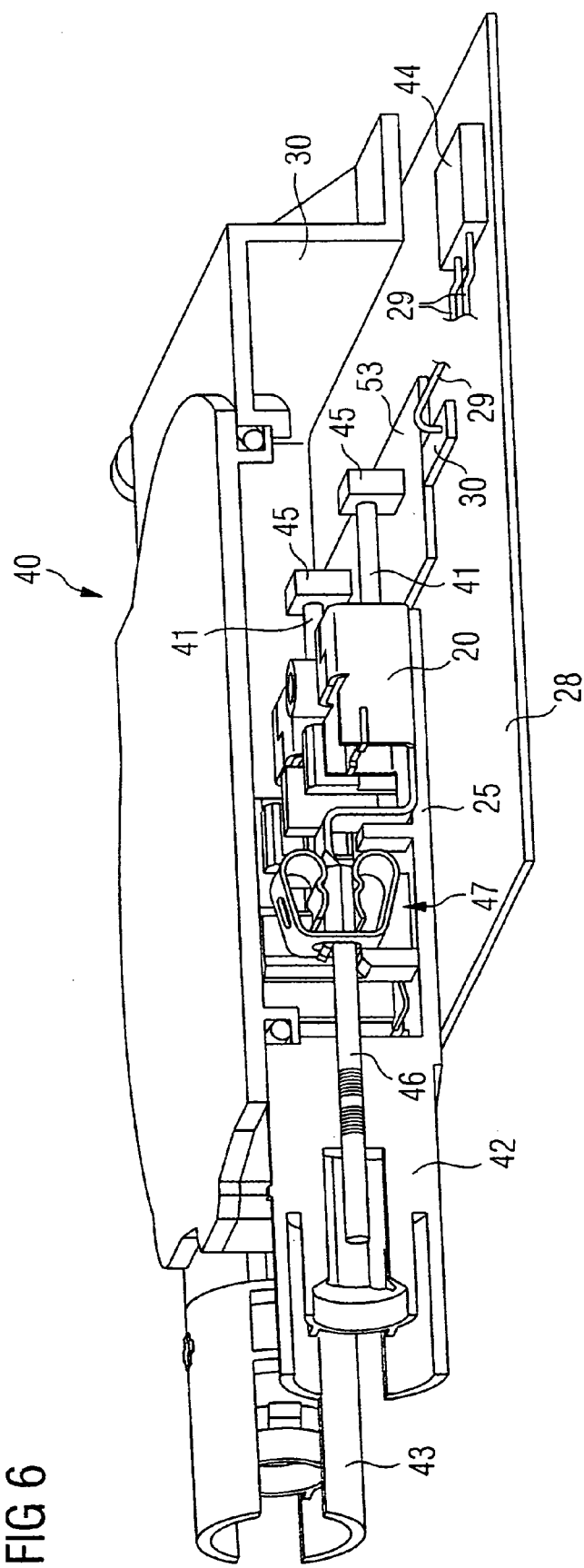
FIG. 6 is a cross-section taken through a connecting box placed on a solar panel.

FIG. 6 shows a cross-section through a third connecting box 40 and a solar panel 28 with fixed contacts 41. The solar panel 28 comprises solar cells 44 generating electrical power from sunlight which is tapped by foil lines 29. The foil lines 29 are soldered to solder tongues 30. The solder tongues 30 are guided to a connection board 53. The connection board 53 is fastened to the solar panel 28, preferably glued. The connection board 53 comprises pins 45 which are formed on the upper side of the connection board 53 and have a fixed length. Fixed contacts 41 are led out at one contact side from the pins 45. The fixed contacts 41 are electrically connected to the solder tongues 30. The connection board 53 and the pins 45 are preferably injected from a plastics material. In the illustrated embodiment, the fixed contacts 41 are constructed in the form of contact tongues arranged parallel to the solar panel 28 or parallel to the arrangement of spring contact arms 32 and the second spring arms 33 of the second contact elements 20.

The third connecting box 40 comprises a receiving space 23 formed in front of the second base board 25 and the second contact elements 20. No base board 25 is provided below the receiving space 23. In an automatic assembling operation the connection board 53 is introduced into the receiving space 23 and then the fixed contacts 41 are inserted into the second contact regions 35 of the second contact elements 20 by a lateral movement of the third connecting box 40. The third connecting box 40 is then placed with the peripheral sealing face, covered with adhesive, on the solar panel 28. Automatic contacting and assembling of the solar panel 28 is possible as the solar panel 28 has a connection board 53 with fixed electrical contacts 41 which are contacted by the foil lines 29 which tap the voltage generated by the solar panel 28.

The third connecting box 40 comprises a contact plug 42 and a contact socket 43 formed on a side wall of the third connecting box 40. The contact plug 42 and the contact socket 43 comprise a pin contact 46 which is electrically connected to the second contact element 20 via a second spring terminal 47.

Figure 7:
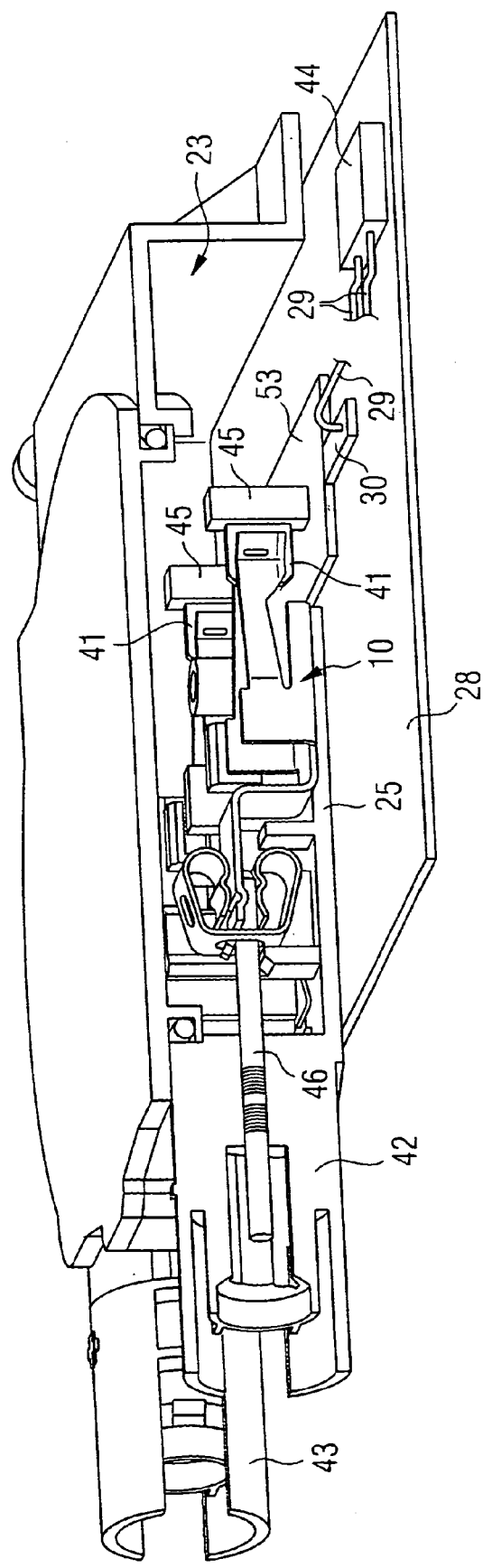
FIG. 7 is a cross-sectional view of a further embodiment of a connecting box provided on a solar panel.

FIG. 7 shows the third connecting box 40 which, however, in the illustrated embodiment comprises first contact elements 10 instead of the second contact elements 20. The first contact elements 10 have, in contrast to the second contact elements 20, receiving regions 17, 18 in the contact regions 19 which are formed substantially perpendicularly to the second base board 25. Corresponding to the orientation of the receiving region 17, 18, the first contact elements 10 are suitable for contacting fixed contacts 41 of the solar panel 28 using an automated assembling operation, which contacts are arranged perpendicularly to the solar panel 28. The solar panel 28 comprises a connection board 53 and pins 45 comprising fixed contacts on one contact side. The contacts 41 are arranged perpendicularly to the solar panel 28 and inserted in the contact regions 19 of the contact elements 10. The third connecting box 40 is assembled on the solar panel 28. The form of the contact elements 10 provides the advantage that the fixed contacts 41 can be contacted by a vertical placement movement of the third connecting box 40. In the process, the fixed contacts 41 are inserted into the contact region 19 of the contact elements 10 via the lower receiving region 18. Therefore, it is not necessary to provide a receiving space 23 when using contact elements 10. Owing to the formation of the front receiving region 17 it is, however, also possible to contact the contact elements 10 via a laterally directed movement of the third connecting box 40 with the fixed contacts 41 of the solar panel 28, the fixed contacts 41 being inserted into the contact region 19 of the contact elements 10 via the front receiving region 17. However, directions of movement during assembly are also possible which comprise a combination of a vertical and a lateral movement operation. A movement of the third connecting box 40, for example at an angle of 45° to the solar panel 28, can also be advantageous in automatic assembling and contacting, depending on the position of the solar panel, the construction of the connection board 53 and the pins 46 and the embodiment of the receiving space 23.

Figure 8:
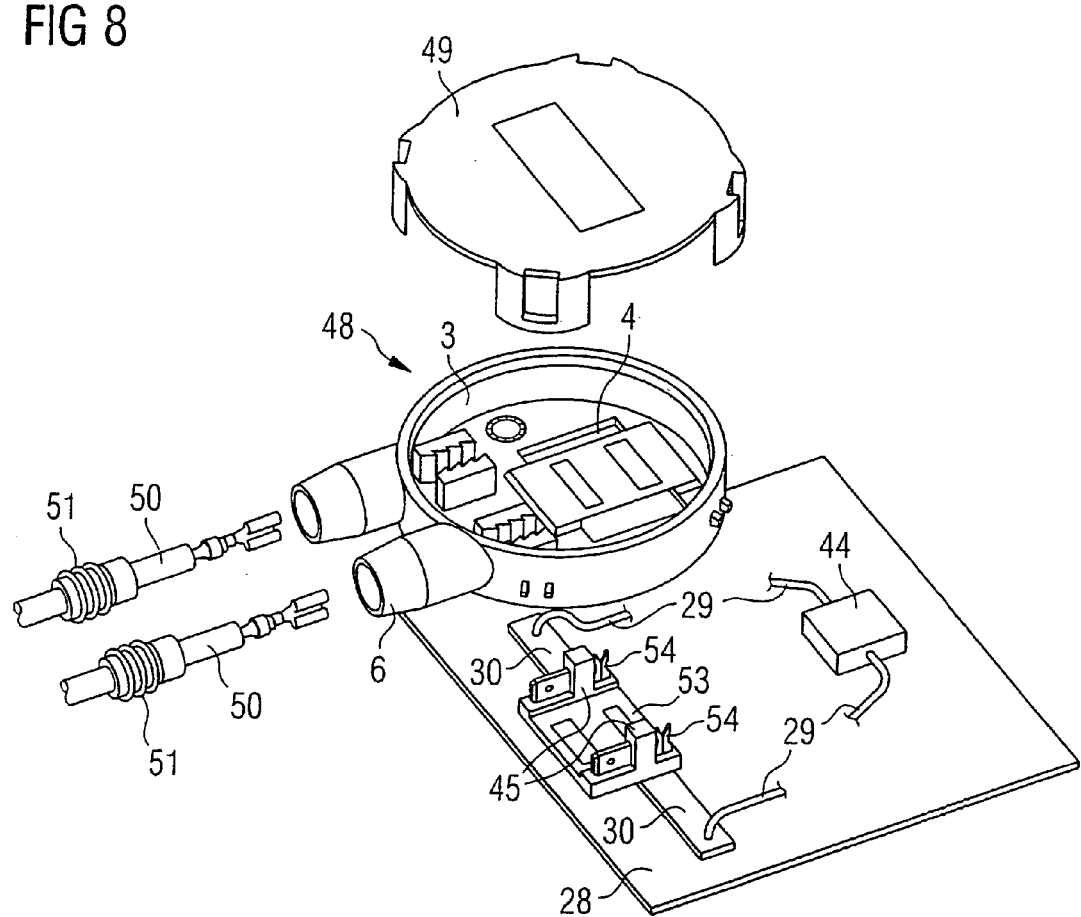
FIG. 8 shows a solar panel with a connecting element and a third embodiment of a connecting box.

FIG. 8 shows a fourth connecting box 48 and a solar panel 28. Solar cells 44, which generate a electric power from sunlight and convey it via two foil conductors 29, are arranged on the solar panel 28. The foil conductors 29 are soldered to contact tongues 30 guided to the connection board 53. The connection board 53 is fastened to the upper side of the solar panel 28. The connection board 53 comprises two pins 45 which have contacts 41 fixed to one contact side. The fixed contacts 41 are electrically connected to the solder tongues 30. The fourth connecting box 48 comprises a base panel in which an opening 4 for feeding the contacts 41 is formed. The fourth connecting box 48 comprises a peripheral side wall 3 delimiting a lid opening. A fourth lid 49 for closing the fourth connecting box 48 is also provided. Cable openings 6 are introduced into the side wall 3. Cables 50, which in the illustrated embodiment have a seal 51, are introduced through the cable openings 6. The fourth connecting box 48 is also suitable for an automatic assembling operation. However, in this embodiment the electrical contact between the fixed contacts 41 and the conductors of the cable 50 has to be carried out by manual contacting. The fourth connecting box 48 is preferably securely glued via a peripheral sealing face to the solar panel.

A contact and holding device 54 comprising two contact and holding arms which are each electrically connected to one of the two fixed contacts 41, is preferably provided on the connection board 53. The contact and holding arms are preferably constructed in the form of insulation piercing connecting devices. The insulation piercing connecting devices are used for holding and contacting a diode or other electrical component with the two fixed contacts 41.

An advantage of the connecting box is the fact that it can be contacted with the electrical terminals of the solar panel via an automatic assembling operation. It is also thus possible to mechanically fasten the connecting box to the solar panel and, at the same time, to electrically contact it with the lines of the solar panel. Simple and inexpensive production of a module, consisting of connecting box and solar panel, is thus possible.

The solar panel has an advantage that a connecting box can be connected to the electric lines of the solar panel via an automatic assembling operation. This advantage is achieved in that the solar panel comprises fixed electrical contacts which can be inserted in a mechanical operation in a contact of the connecting box.

What is claimed is:

1. A connecting box for a solar panel comprising:
a housing having an opening for introducing contacts of the solar panel;
contact elements disposed in the housing for electrically connecting to the contacts of the solar panel, the contact elements having a tapered receiving region and a contact region extending from the tapered receiving region for automatic introduction of a contact of the solar panel via the receiving region into the contact region; and
a base board for receiving the housing, the base board having an opening positioned along the opening of the housing, and the housing having a receiving space for insertion of the contact being laterally offset from a lid opening.

2. The connecting box according to claim 1, wherein the contact element comprises two spring contact arms, the two spring contact arms have a spacing in the contact region which is smaller than the width of a contact to be inserted therein.

3. The connecting box according claim 1, wherein the receiving region extends over an angular range of up to 90°.

4. The connecting box according to claim 1, wherein the connecting box comprises a flat, peripheral sealing face on the lower side for gluing the connecting box to the solar panel.

5. The connecting box according to claim 1, wherein the housing has a partially rectangular shape in the region of the receiving space.

* * * * *